(12) United States Patent
Milligan et al.

(10) Patent No.: US 7,513,052 B2
(45) Date of Patent: Apr. 7, 2009

(54) LIGHT LINE GENERATING DEVICE

(75) Inventors: Michael A. Milligan, Gananoque (CA); Ted Andrew Kimball, Oxford Station (CA); Mark Slobodian, Ottawa (CA); Oleksiy P. Sergyeyenko, Brockville (CA); Robert J. B. Hobden, Ontario (CA)

(73) Assignee: Black and Decker, Newark, DE (US)

( * ) Notice: Subject to any disclaimer, the term of this patent is extended or adjusted under 35 U.S.C. 154(b) by 0 days.

(21) Appl. No.: 11/535,858

(22) Filed: Sep. 27, 2006

(65) Prior Publication Data

US 2007/0153532 A1 Jul. 5, 2007

Related U.S. Application Data

(63) Continuation-in-part of application No. 11/140,476, filed on May 27, 2005, now abandoned, which is a continuation of application No. 10/277,474, filed on Oct. 22, 2002, now Pat. No. 6,914,930.

(60) Provisional application No. 60/736,818, filed on Nov. 15, 2005.

(51) Int. Cl.
*G01C 15/00* (2006.01)
(52) U.S. Cl. .............................. 33/290; 33/291; 33/228; 33/DIG. 21
(58) Field of Classification Search ........... 33/290–291, 33/286, DIG. 21, 281–283, 228, 275 R
See application file for complete search history.

(56) References Cited

U.S. PATENT DOCUMENTS

| 4,090,781 | A | 5/1978 | Godot et al. |
|---|---|---|---|
| 4,852,265 | A | 8/1989 | Rando et al. |
| 4,912,851 | A | 4/1990 | Rando et al. |
| 4,934,061 | A | 6/1990 | Knight et al. |
| 5,459,932 | A | 10/1995 | Rando et al. |
| 5,539,990 | A * | 7/1996 | Le .............................. 33/283 |
| 5,541,727 | A | 7/1996 | Rando et al. |
| 5,619,802 | A | 4/1997 | Rando et al. |
| 5,842,282 | A | 12/1998 | Ting |
| 5,914,778 | A | 6/1999 | Dong |
| 5,992,029 | A | 11/1999 | Dong |
| 6,009,630 | A | 1/2000 | Rando |
| 6,043,879 | A | 3/2000 | Dong |
| 6,073,356 | A | 6/2000 | Li |
| 6,133,996 | A | 10/2000 | Plumb et al. |
| 6,351,890 | B1 | 3/2002 | Williams |
| 6,763,596 | B1 | 7/2004 | Puri et al. |
| 6,829,834 | B1 | 12/2004 | Krantz |
| 6,848,188 | B2 | 2/2005 | Tacklind et al. |
| 6,914,930 | B2 | 7/2005 | Raskin |

(Continued)

*Primary Examiner*—Yaritza Guadalupe-McCall
(74) *Attorney, Agent, or Firm*—Edell, Shapiro & Finnan, LLC

(57) ABSTRACT

A device that generates a light line on a work surface such as a wall is disclosed. The device includes a housing containing a self-leveling pendulum assembly and a light source that directs a light beam along a pathway. A redirection assembly, also contained in the housing, is capable of altering the pathway of the light beam prior to exiting the housing. The device may further include a measuring tool responsive to rotation of the housing on the work surface. In use, the device selectively generates a light line on the work surface in a desired direction.

49 Claims, 10 Drawing Sheets

U.S. PATENT DOCUMENTS

| | | | |
|---|---|---|---|
| 6,964,106 B2* | 11/2005 | Sergyeyenko et al. | 33/286 |
| 7,134,211 B2* | 11/2006 | Bascom et al. | 33/286 |
| 7,134,212 B2* | 11/2006 | Marshall et al. | 33/286 |
| 7,155,835 B2* | 1/2007 | Hayes et al. | 33/286 |
| 7,178,250 B2* | 2/2007 | Nash et al. | 33/286 |
| 7,237,341 B2* | 7/2007 | Murray | 33/286 |
| 7,310,887 B2* | 12/2007 | Nash et al. | 33/286 |
| 7,316,073 B2* | 1/2008 | Murray | 33/286 |
| 7,392,591 B2* | 7/2008 | Milligan et al. | 33/286 |
| 2002/0166249 A1 | 11/2002 | Liao | |
| 2003/0029050 A1* | 2/2003 | Fung et al. | 33/626 |
| 2005/0078303 A1* | 4/2005 | Murray | 356/138 |
| 2005/0161241 A1 | 7/2005 | Frauhammer et al. | |
| 2005/0204570 A1 | 9/2005 | Bascom et al. | |
| 2006/0013278 A1 | 1/2006 | Raskin et al. | |
| 2007/0124948 A1* | 6/2007 | Nash et al. | 33/286 |
| 2007/0175054 A1* | 8/2007 | Murray | 33/286 |
| 2007/0227017 A1* | 10/2007 | Milligan et al. | 33/228 |

* cited by examiner

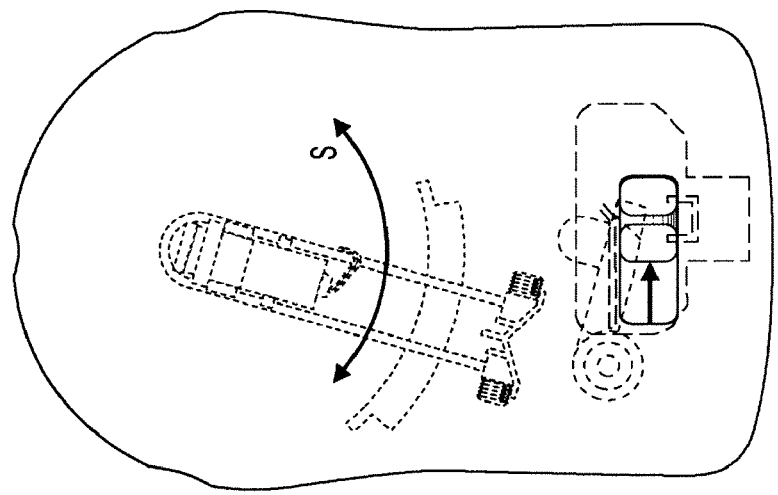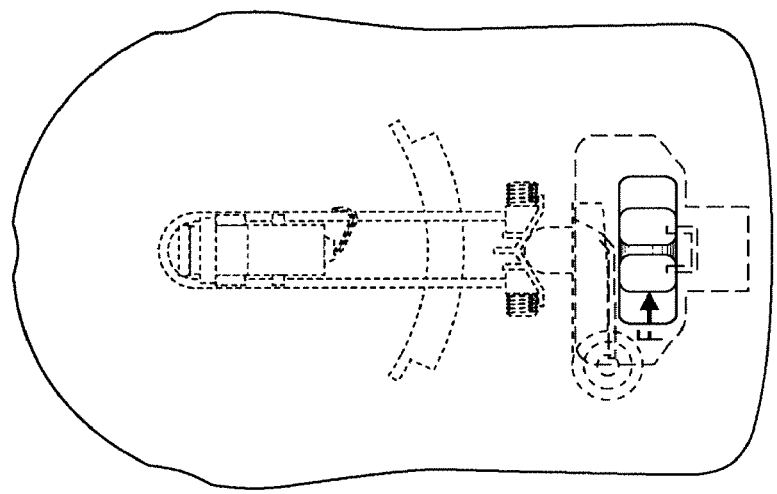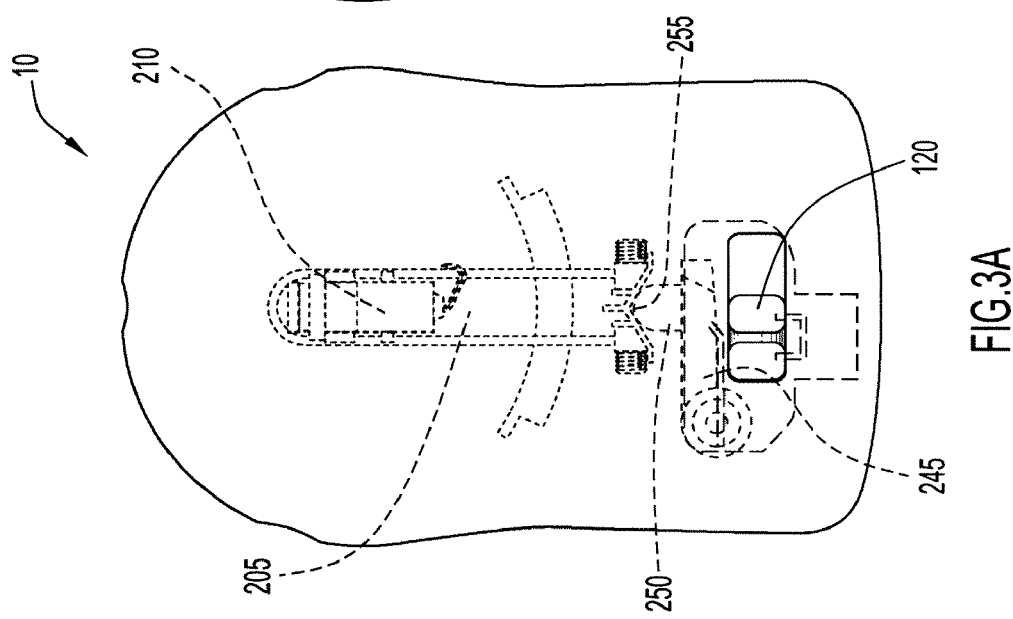

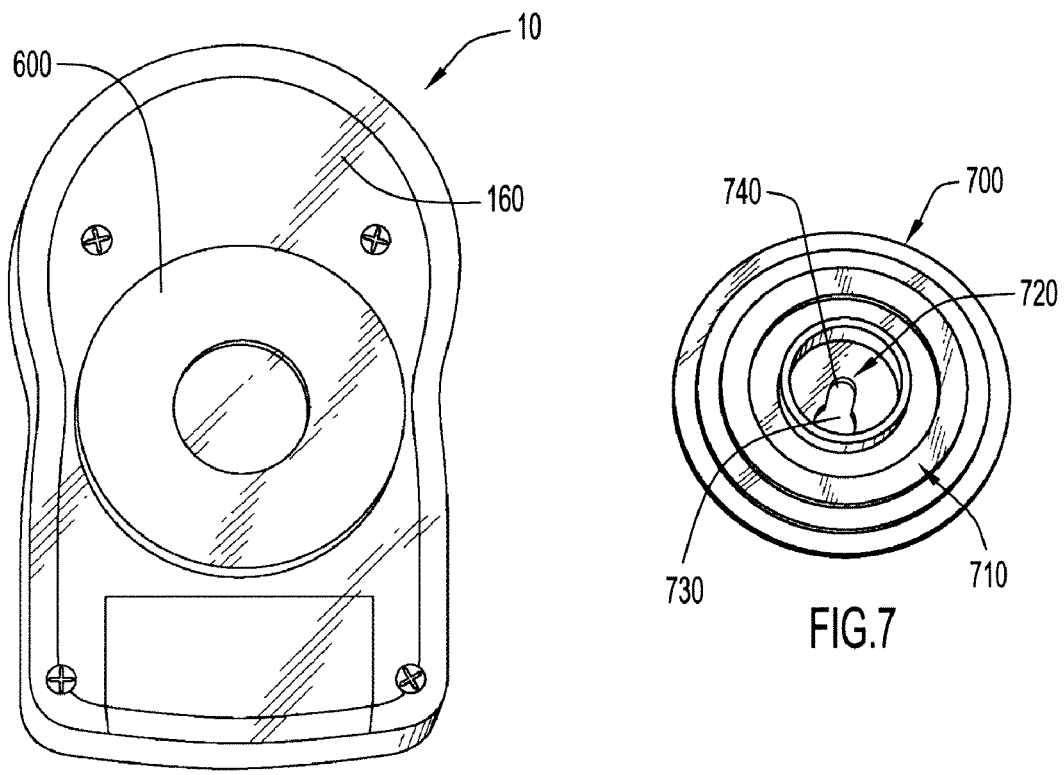
FIG.6
FIG.7
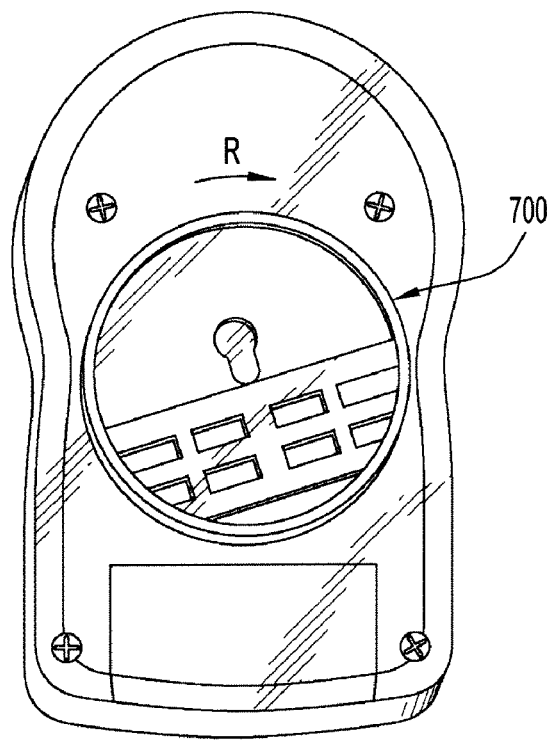
FIG.8

LIGHT LINE GENERATING DEVICE

CROSS REFERENCE TO RELATED APPLICATIONS

This application is a continuation-in-part of U.S. application Ser. No. 11/140,476, filed on 27 May 2005 and entitled "LASER LEVEL", which is a continuation of U.S. patent application Ser. No. 10/277,474, filed 22 Oct. 2002 and entitled "LASER LEVEL", now U.S. Pat. No. 6,914,930. This application also claims the benefit of a provisional Patent Application No. 60/736,818, filed on 15 Nov. 2005 and entitled "LASER LEVEL". The disclosures of the aforementioned application and patent documents are incorporated herein by reference in their entireties.

FIELD OF THE INVENTION

The present invention relates to a light line generating device and, in particular, to a self-leveling laser level including a redirection assembly operable to selectively direct a single source laser beam in a plurality of directions.

BACKGROUND OF THE INVENTION

Alignment of surfaces is a common problem in a variety of fields, ranging from construction to interior decorating. Proper spatial alignment is necessary to ensure that walls are perpendicular to a floor, or otherwise plumb. Laser level devices are often used in construction to produce a plane of light that serves as a reference for various projects. Laser level devices save considerable time and effort during the initial layout of a construction project as compared to other tools such as beam levels, chalk lines, or torpedo levels. Some examples of projects where laser level devices are useful include laying tile, hanging drywall, mounting cabinets, installing counter tops, and building outdoor decks.

SUMMARY OF THE INVENTION

A light line generating device in accordance with the present invention is disclosed herein. The light line generating device of the present invention may include a pendulum assembly and a light beam redirection assembly. The pendulum assembly may include a self-leveling pendulum and a light source coupled to the pendulum. The pendulum assembly and light source may be configured to emit a light beam along a generally vertical pathway. The light beam redirection assembly may be capable of altering the travel path of a light beam emitted by the light source. Specifically, the redirection assembly may be selectively positioned to alter the travel path of the light beam to a desired direction (e.g., to a generally horizontal direction). The light line generating device may further include an internal protractor capable of automatically measuring the angular position of the device with respect to a normal or reference position/orientation.

BRIEF DESCRIPTION OF THE DRAWINGS

FIGS. 3A-3C illustrate internal views of the light line generating device of FIG. 1A, showing the operation of the pendulum lock mechanism.

FIG. 6 illustrates a rear perspective view of the light line generating device of FIG. 1, showing the connection ring for a surface mount device.

FIG. 7 illustrates an isolated perspective view of a surface mounting device according to an embodiment of the present invention.

FIG. 8 illustrates the surface mounting device of FIG. 7 connected to the light line generating device of FIG. 6.

Like reference numerals have been used to identify like elements throughout this disclosure.

DETAILED DESCRIPTION OF THE INVENTION

Figure 1A:
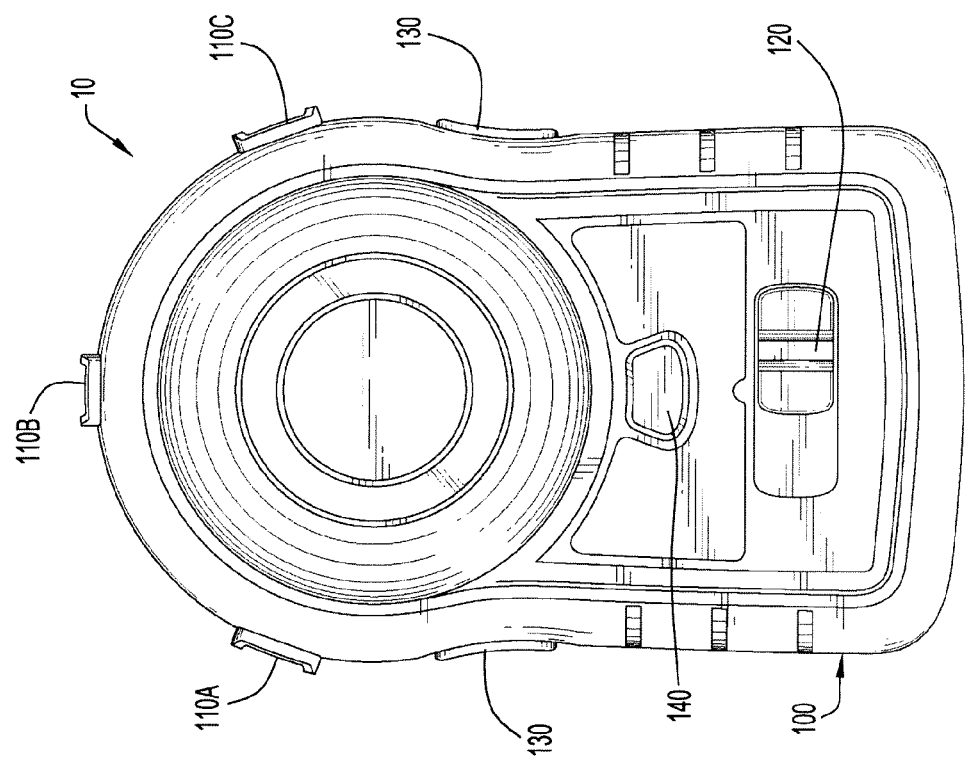
FIG. 1A illustrates a front view a light line generating device according to an embodiment of the present invention.
Figure 1B:
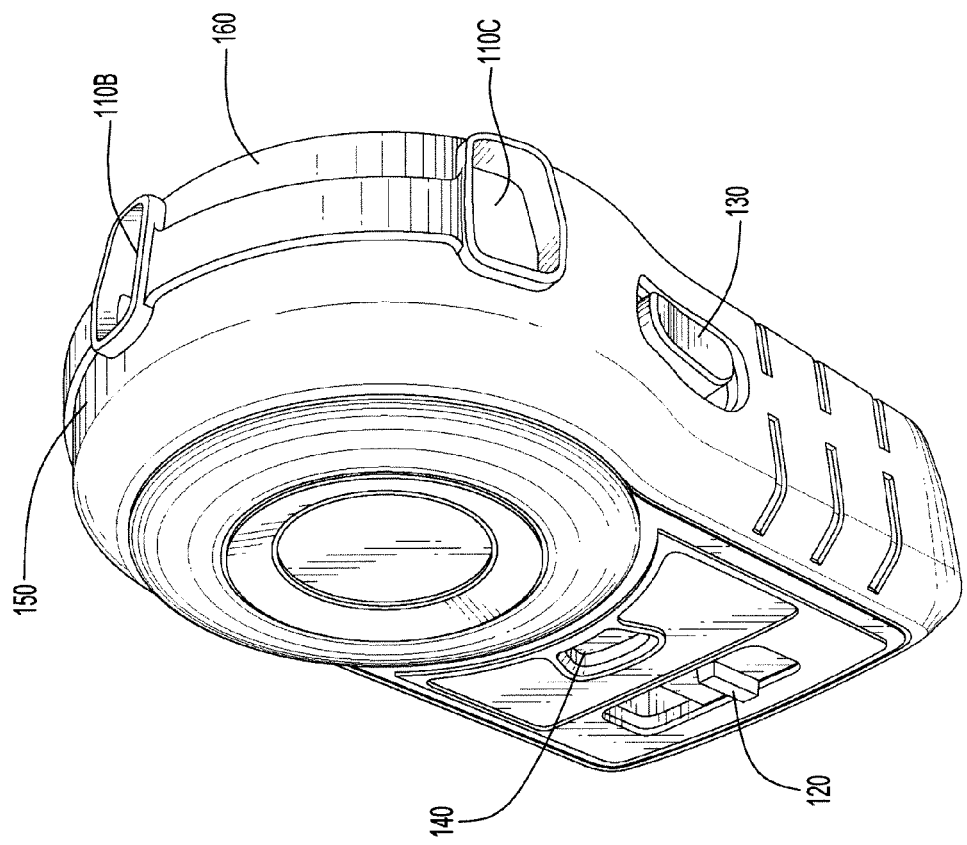
FIG. 1B illustrates a perspective view of the light line generating device of FIG. 1A.

FIGS. 1A and 1B are front and perspective views, respectively, of a light line generating device according to an embodiment of the present invention. As shown, the light line generating device 10 may include a housing or shell 100 including one or more windows 110A-C operable to permit the transmission of a light beam from the housing 100. The term window not only includes an opening with a transparent or translucent covering, but also to uncovered apertures through which a beam of light may pass. The number, shape, and/or dimensions of a window 110A-C are not particularly limited to that which is illustrated herein. When a plurality of windows 110A-C is present, the windows may be angularly spaced about the housing 100 at any angle suitable for their described purpose. By way of specific example, as shown in FIG. 1A, the top portion of the housing 100 may include a first window 110A, a second window 110B, and a third window 110C angularly spaced from each other. The angle between the windows may include, but is not limited to, approximately 45°-90°. By way of example, the second window 110B may be generally aligned with an axis extending vertically through the housing 100, while the first window 110A and/or the third window 110C may be generally aligned with an axis extending horizontally through the housing.

The housing 100 may further include a first actuator 120, a second actuator 130, and viewing pane 140 (each discussed in greater detail below). The housing 100 may be formed as a unitary structure or may be formed from a front portion 150 and a rear portion 160 (best seen in FIG. 1B). The housing 100 may be formed from a hard, impact-resistant, preferably moldable material such as a hard thermoplastic material such as ABS or polystyrene. The housing 100 may also include a grip portion formed from soft or low durometer thermoplastic elastomer adhered or overmolded to the housing 100. Alternatively or additionally, the grip portion may be formed from "soft-touch" elastomer materials such as SANTOPRENE, KRATON, and MONOPRENE.

Figure 2A:
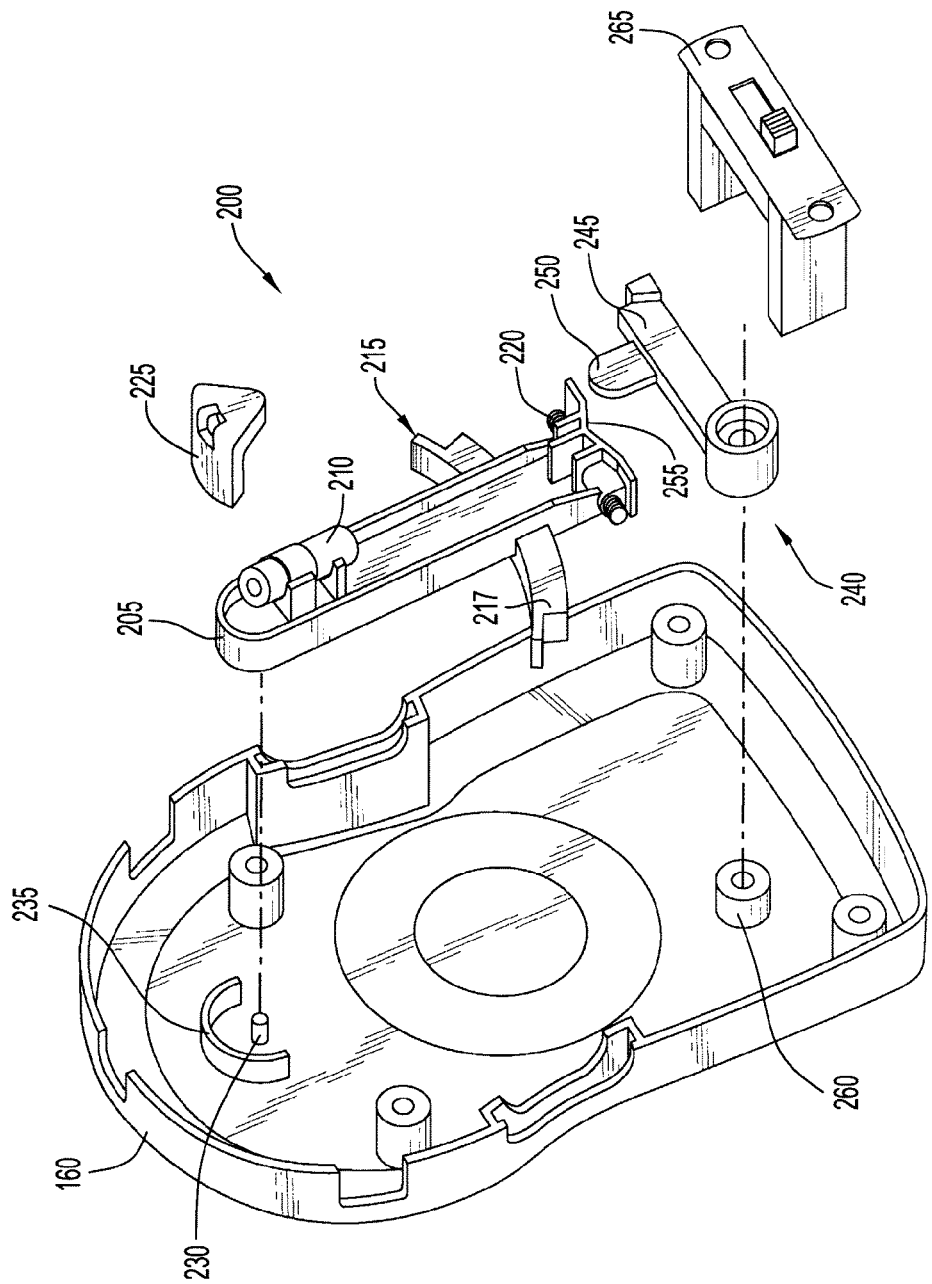
FIG. 2A illustrates an exploded view of the light line generating device of FIG. 1A, with the front housing portion removed for clarity.
Figure 2B:
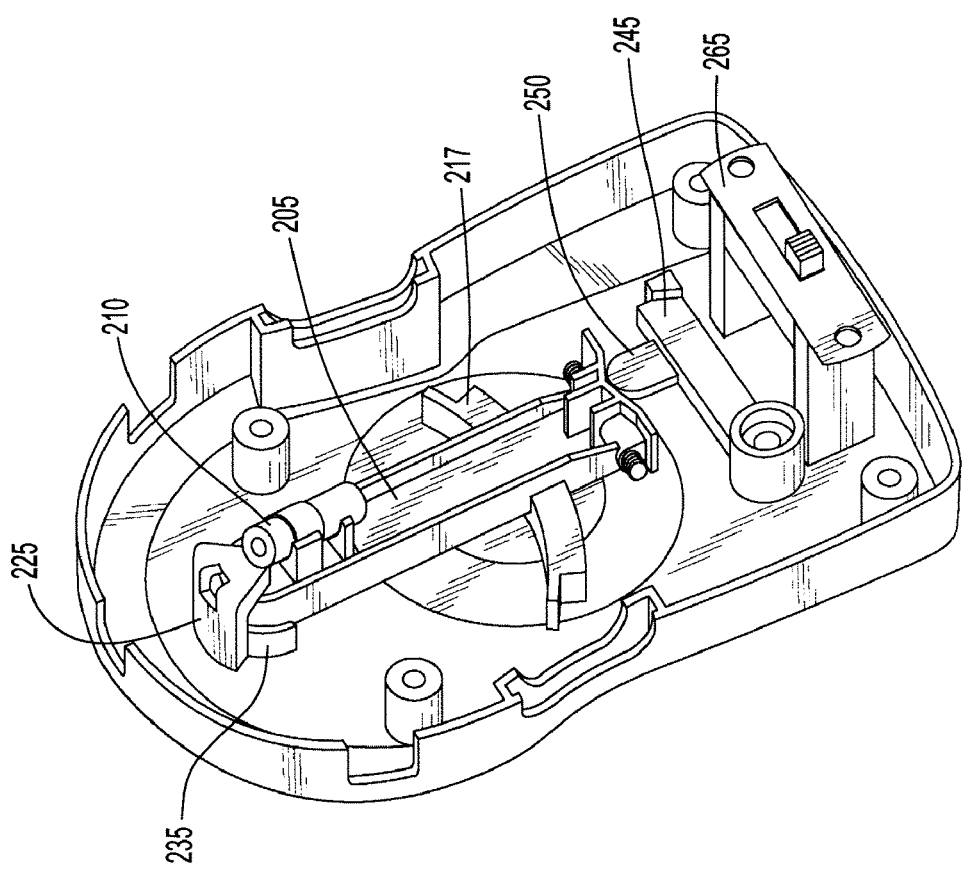
FIG. 2B illustrates a front perspective view of the light line generating device of FIG. 1A, with the front housing portion removed for clarity.

The light line generating device 10 may further contain a pendulum assembly. FIGS. 2A and 2B are front perspective views of the light line generating device 10 of FIGS. 1A and 1B, with the front housing portion 150 removed for clarity. As shown in the exploded view of FIG. 2A, the pendulum assembly 200 may include a pendulum 205, a light line generating unit or light source 210, a damping mechanism 215, a calibration mechanism 220, and/or a bearing cap 225. The pendulum 205 may be coupled to the rear housing portion 160 such that it freely pivots within the housing 100 (i.e., it may be pendulously suspended). By way of example, the pendulum 205 may pivotally couple to a post 230 extending from the interior surface of the rear housing portion 160. A guide member 235 may be positioned above the post 230 to direct and/or limit the degree and/or direction of pivot in the pendulum 205. By way of example, the pendulum 205 may swing about 12° (±6° from its normal (0°) position). One or more bearings (not shown) may optionally be provided between the pendulum 205 and the post 230 to allow for a more fluid and consistent motion. In addition, a bearing cap 225 may be secured to the guide member 235, capturing the pendulum 205 to the rear housing portion 160 (best seen in FIG. 2B).

In operation, the pendulum 205 is capable of swinging within the housing 100 about a pivot axis which is generally transverse to the light beam generated by the light source 210, creating a self-leveling pendulum assembly 200 operable to create a substantially vertical (plumb) light line when the light line generating device 10 is placed against a generally vertical work surface such as a wall. The pendulum 205 may self-level even if the work surface is uneven, or even if the device 10 is placed against the work surface in a slightly tilted orientation.

The light source 210 may include a device operable to generate a light beam LB (see FIGS. 5A-5C) such as a light plane or line. The light source 210 may be fixed to the pendulum 205, proximate its upper end (i.e., closer to the redirection assembly 400—described below). By way of example, the light source 210 may include, but is not limited to, a laser assembly including a barrel that houses a laser diode, a collimating lens, and a line lens (none illustrated). The collimating lens forms a laser beam exiting the laser diode into a beam having a generally oval cross-section. The line lens then converts the laser beam into multiple, superimposed planar beams (i.e., laser planes having different focal distances). Additional information regarding the configuration of the light source 210, and in particular, an exemplary laser assembly, is disclosed in U.S. Published Patent Application No. 2006/0013278 (Raskin et al.), the disclosure of which is incorporated herein by reference in its entirety. A power source (not illustrated), connected to the light source 210, may be controlled via a switch 265 in communication with the first actuator 120.

In operation, the light source 210 generates the light beam LB, directing it along a pathway. In particular, the light beam LB may be directed along a generally vertical pathway, toward the redirection assembly 400 (i.e., the light source 210 is oriented to direct the light beam upward, along the longitudinal axis of the pendulum 205, as discussed in greater detail below. The light beam LB travels out of the housing 100 (through a window 110A, 110B, 110C) generating a light line onto a work surface such as a wall.

The damping mechanism 215 is capable of decreasing the amplitude of the pendulum 205. The damping mechanism 215 may be any mechanism suitable for its described purpose (i.e., damping the motion of pendulum 205). By way of example, the damping mechanism 215 may include curved bar 217 with a metal (e.g., copper) plate on its underside. The interior surface of the rear housing portion 160 (not illustrated) may include magnets configured to align with the metal plate on the curved bar 217. The metal plate may be formed and positioned such that a precise gap is maintained at a predetermined width when the pendulum 205 is motion (i.e., as the pendulum swings about the post 230). The interaction between the eddy currents in copper plate with the magnetic field of the magnets causes damping of swaying motion of pendulum 205. Further information regarding the damping mechanism 215 may be found in U.S. Pat. No. 5,144,487, the disclosure of which is incorporated herein by reference in its entirety.

The calibration mechanism 220 of the pendulum assembly 200 operates to calibrate the orientation of the pendulum 205. By way of example, the calibration mechanism 220 may include a balance screw disposed proximate the base of the pendulum 205. The calibration mechanism 220 may be utilized to adjust the pathway of the laser beam LB and, in particular, to allow the light source 210 to be angularly adjusted along a vertical plane relative to the housing 100.

The light line generating device 10 of the present invention may further include a lock mechanism 240 configured to stabilize the pendulum 205, preventing its pivotal motion. The lock mechanism 240 may include a bar 245 with a tab 250 configured to engage a depression 255 formed in the bottom surface of the pendulum 205. The bar 245, pivotally coupled to a post 260, may be spring biased upward such that, in its normal position, the tab 250 engages the depression 255 in the pendulum 205, preventing its pivotal motion. The first actuator 120 may be engaged to selectively drive the bar 245 downward, disengaging the tab 250 from the depression 255 in the pendulum 205. Once disengaged, the pendulum 205 is free to pivot/swing about the post 230.

The operation of the pendulum assembly 200 and associated lock mechanism 240 is explained with reference to FIGS. 3A, 3B, and 3C, which illustrate front, internal views of the light line generating device 10 of FIG. 1A. Referring to FIG. 3A, the first actuator 120 (e.g., a slide actuator) begins in a first position, in which the bar 245 of the lock mechanism 240 positions the tab 250 within the depression 255 of the pendulum 205. In this position, the pendulum 205 is secured, preventing its pivotal movement. This, in turn, generally immobilizes the light source 210.

Engaging the first actuator 120 by applying a force (as indicated by arrow F in FIG. 3B) moves the first actuator 120 from its first position to a second position. In the second position (of FIG. 3B), the first actuator 120, in communication with the switch 265, activates the light source 210, generating a light beam LB. In this position, the lock mechanism 240 is still engaged and the pendulum is immobilized.

Continuing to apply the force F moves the first actuator from the second position to a third position (FIG. 3C). In this third position, the first actuator 120 drives the bar 245 of the lock mechanism 240 downward, removing the tab 250 from the depression 255 of the pendulum 205. As a result, the pendulum 205 is free to pivot about the post 230 within the housing 100 (indicated by arrow S), engaging the self leveling feature, where the light source 210 directs the light beam LB in a substantially vertical direction. Thus, the pendulum 205 may be unlocked with the light source 210 activated (shown in FIG. 3C) to get self-leveling (or self-adjusting) horizontal or vertical lines (as described below).

In this manner, a user may selectively activate the light source 210 and/or self-leveling feature of the light line generating device 10. Selectively preventing the movement of the pendulum 205 relative to the housing 100 not only prevents damage to the pendulum 205 during storage and/or transport, but also enables a user to stabilize the light line generated on the work surface (i.e., it prevents the light line from self-leveling). As a result, the housing 100 may be rotated manually to project a light line onto the work surface at an angle other than substantially horizontal and/or substantially vertical.

In another embodiment, the switch 265 may further be operatively connected to a light-emitting diode (LED) configured to illuminate the portion of the measuring tool 405 (FIG. 4A) viewable through the viewing pane 140 of the housing 100. Specifically, the LED may be engaged while the first actuator 120 is in its second position (FIG. 3B), but not engaged when the first actuator 120 is in its first (FIG. 3A) and/or third (FIG. 3C) positions. With this configuration, the light line generating device 10 indicates when the measuring tool 405 may be properly utilized. Specifically, it may illuminate the measuring tool 405 when the pendulum 205 is locked and the light beam is stabilized (e.g., when the first actuator 120 is in the second position), but not illuminate the measuring tool when the pendulum 205 is unlocked and the light beam is self-leveling (e.g., when the first actuator 120 is in the third position).

In another embodiment of the present invention, the light line generating device 10 may include a shutter (not illustrated) disposed in front of the measuring tool 405 and behind the viewing pane 140. The shield may be configured to open when the first actuator 120 is in its second position (FIG. 3B), indicating the pendulum 205 is locked and the measuring tool 405 may be utilized. The shutter, moreover, may be adapted to close, blocking the view of the measuring tool 405 through the viewing pane 140 when the actuator 120 is in its third position (FIG. 3C), preventing the user from utilizing the measuring tool 405 when the pendulum 205 is unlocked.

Figure 4A:
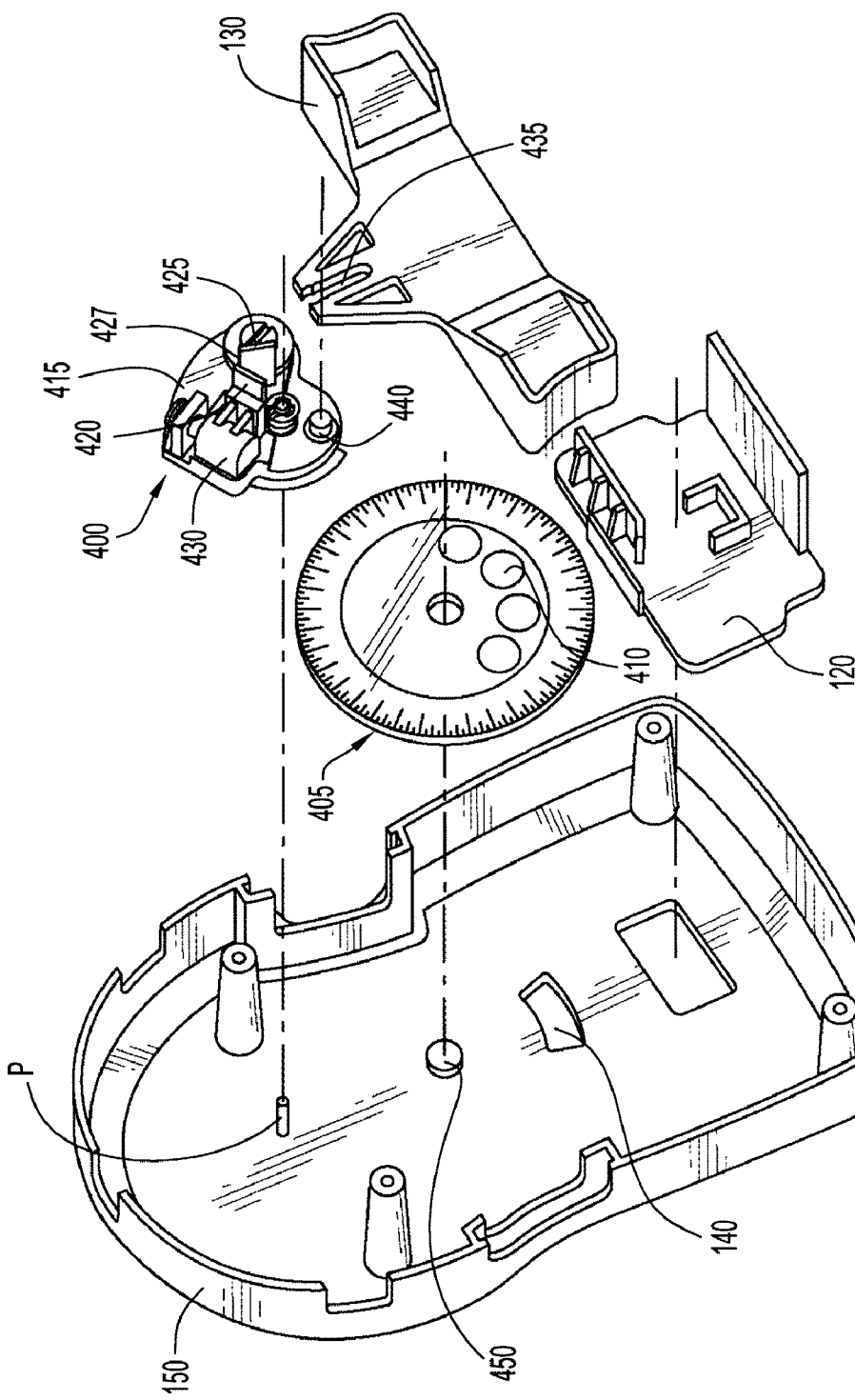
FIG. 4A illustrates an exploded view of the light line generating device of FIG. 1A, with the rear housing portion removed for clarity.
Figure 4B:
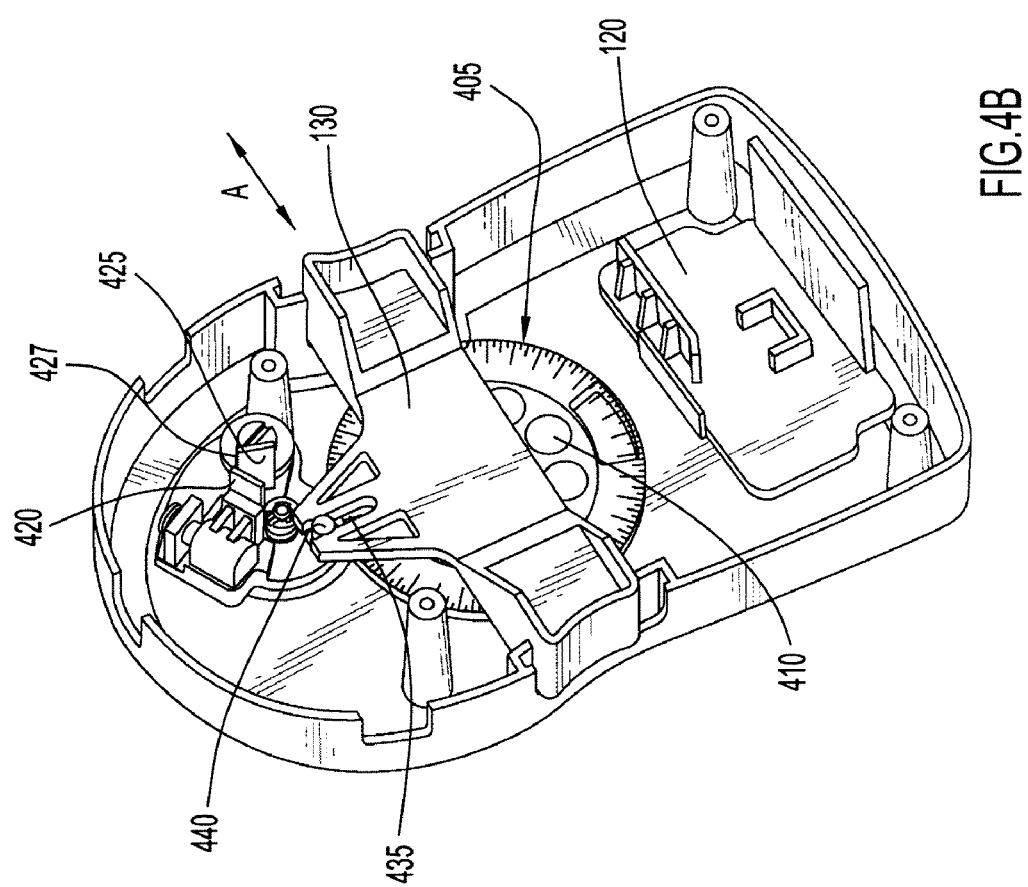
FIG. 4B illustrates a rear perspective view of the light line generating device of FIG. 1A, with the rear housing portion removed for clarity.

FIGS. 4A and 4B are rear perspective views of the light line generating device 10 of FIG. 1A, with the rear housing portion 160 removed for clarity. Referring to FIG. 4A, showing an exploded view, the light line generating device 10 may further include a redirection assembly 400 and a measuring tool 405. The redirection assembly 400 includes a structure operable to selectively redirect the light beam LB generated by the light source 210 in a plurality of directions. For example, the redirection assembly 400 may be configured to direct the light beam LB from the light source 210 (having, e.g., a substantially vertical pathway) through the first window 110A, the second window 110B, or the third window 110C of the housing 100.

In the embodiment illustrated in FIGS. 4A and 4B, the redirection assembly 400 is a mirror assembly including a base or platform 415 with a first mirror 420 and a second mirror 425. The positioning of the mirrors 420, 425 is not particularly limited to that illustrated herein, so long as the mirrors 420, 425 are capable of redirecting the light beam LB by the desired angle (e.g., altering the path of the light beam (by 90° in the illustrated example)). The first mirror 420, for example, may be spaced approximately 45° from the second mirror 425, creating a gap 427 between the first mirror 420 and the second mirror 425. In other words, each mirror 420, 425 may be about 22.5° from a generally vertical line intersecting the gap 427 between the mirrors. This positions the mirrors 420, 425 such that the light beam LB traveling from the light source 210 (e.g., along a substantially vertical pathway) may either reflect off the mirror pair 420, 425 or pass through the gap 427 (discussed in greater detail below).

One or both mirrors 420, 425 may further be associated with a calibration tool 430 (e.g., a spring biased screw) configured to angularly adjust the position of a mirror 420, 425 on the platform 415 and/or the position of one mirror 420, 425 with respect to the other mirror 420, 425. In the embodiment illustrated in FIGS. 4A and 4B, the second mirror 425 is fixed to the platform 415, while the first mirror 420 is adjustable.

The redirection assembly 400 may be moveably coupled to the housing front portion 150. Specifically, the redirection assembly 400 may be rotatably mounted on a post P extending from the interior surface of the housing front portion 150. The redirection assembly 400 may be rotated about the post P to selectively orient the redirection assembly and, in turn, the relationship of the mirrors with respect to the light source 210/light beam LB. The second actuator 130 may be utilized to drive the rotation of the redirection assembly 400 about the post P and, in turn, to selectively alter the travel path of the light beam LB generated by the light source 210 as it travels through the housing 100. Specifically, the second actuator 130 may include a channel 435 that captures a post 440 extending from the platform 415 of the redirection assembly 400. The second actuator 130 may be configured to slide transversely through the housing 100 (indicated by arrow A in FIG. 4B) such that, as it slides, it rotates the platform 415, repositioning the mirrors 420, 425. Detents may be provided to indicate the desired rotational stopping points for the platform 415.

Figure 5A:
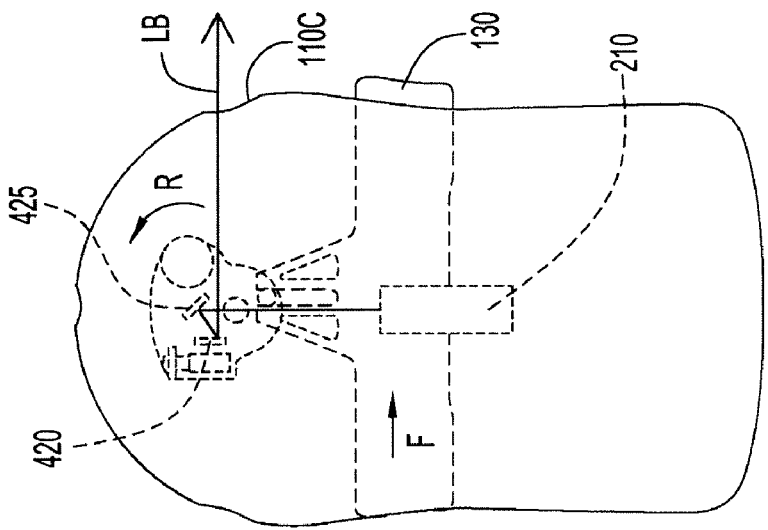
FIGS. 5A-5C illustrate internal views of the light line generating device of FIG. 1A, showing the operation of the light beam redirection assembly.
Figure 5B:
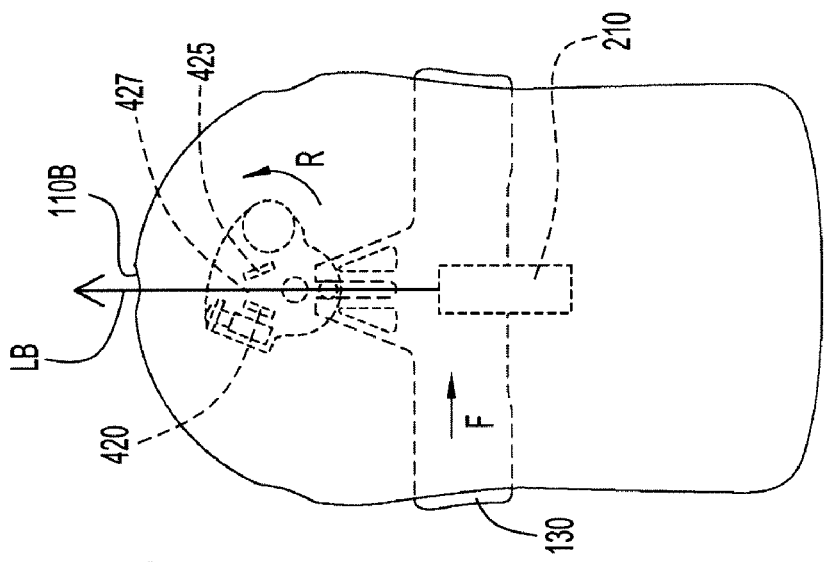

Operation of the redirection assembly 400 of the light line generating device 10 in accordance with the present invention is explained with reference to FIGS. 5A, 5B, and 5C, which show front, internal views of the device 10 of FIG. 1A. As explained above, the light source 210 may be mounted on the pendulum 205 such that the light beam LB generated by the light source 210 is directed toward the redirection assembly 400 (e.g., along a generally vertical travel path). Referring to FIG. 5A, the redirection assembly 400 may be oriented in a first position, in which the light beam LB may be redirected about −90° such that it is directed out of the first window 110A. Specifically, the first mirror 420 is positioned within the travel path of the vertical light beam LB; consequently, the light beam reflects off the first mirror 420, then off the second mirror 425. This redirects the substantially vertical light beam LB to have a substantially horizontal travel path, exiting the housing 100 through the first window 110A.

As explained above, engaging the second actuator 130 repositions the mirror assembly 400 with respect to the light source 210. Referring to FIG. 5B, applying a force (indicated by arrow F) causes the second actuator 130 to slide to the right and to rotate the redirection assembly 400 (indicated by arrow R), moving it from the first position to a second position. The degree of rotation may include, but is not limited to, approximately 45°. In this second position, neither the first mirror 420 nor the second mirror 425 is positioned in the travel path of the light beam LB. As a result, the light beam LB may be permitted to maintain its generally vertical travel path, passing through the redirection assembly 400 (through the gap 427 between the mirrors 420, 425) and out through the second window 110B.

Figure 5C:
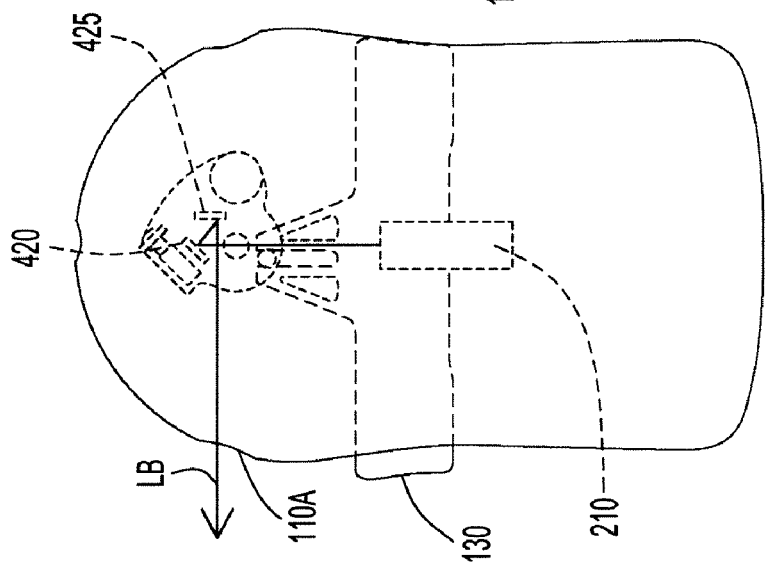

Referring to FIG. 5C, continuing to apply the force F to the second actuator 130 continues the rotation (indicate by arrow R) of the redirection assembly 400 within the housing 100 (e.g., further rotating the redirection assembly approximately 45°) to orient the redirection assembly 400 in a third position. In this third position, the light beam LB may be redirected about 90° such that it is directed out of the third window 110C. Specifically, the second mirror 425 is now positioned in the travel path of the vertical light beam LB; consequently, the light beam reflects off the second mirror 425, then off the first mirror 420. This redirects the substantially vertical light beam LB to have a substantially horizontal travel path, exiting the housing 100 through the third window 110C. In order to return the redirection assembly 400 back to the first or second positions, an opposite force (not illustrated) may be applied to slide the second actuator 130, rotating the redirection assembly in an opposite direction.

In this manner, a user may selectively orient the redirection assembly 400 to selectively control/direct the travel path of the light beam LB generated by the light source 210. This configuration permits a single light source 210 to generate a light line on a work surface in a plurality of different directions (e.g., horizontal left, vertical, horizontal right). Each light line generated on the work surface may be self-leveling due to the pendulum assembly 200. Alternatively, the light line may be fixed with respect to the housing, enabling the user to adjust manually the light line by repositioning the housing 100. This configuration enables a user to user to direct a light line in a desired direction, depending on the alignment needs of the work surface.

The measuring tool 405 (see FIGS. 4A and 4B) may be configured to respond to the rotation of the housing 100 on a work surface (e.g., a generally vertical work surface such as a wall). Specifically, the measuring tool 405 may be configured to measure the angle at which the light line generating device 10 has been rotated and/or offset from its normal (e.g., upright/plumb) position. For example, the measuring tool 405 may include a protractor and, particularly, a gravity responsive protractor. The gravity response protractor may be a 360° protractor adapted to freely rotate around a center axis 450. The protractor may include a weighted area 410 including one or more weights positioned proximate the normal position of the protractor (and thus, of the light source 10). The weighted area 410, due to gravity, maintains a constant protractor position with respect to a plumb line (or the plumb direction) while the light line generating device 10 is rotated. For example, when the light line generating device 10 is rotated from its normal, upright/plumb orientation, the weighted area 410 is drawn back to normal, rotating the protractor around the axis 450. Indicia (e.g., angle measurement marks) on the protractor may be viewed through the viewing pane 140 on the front housing portion. In this manner, the light line generating device 10 may automatically measure the angle of tilt of the device 10 (regardless of how far the housing 100 is rotated) and, as such, the angle from a projected reference line (light beam LB).

By way of further example, when the reference line (the light beam LB) is projected out of the second (vertical) window 110B, a user may lock the pendulum 205 to stabilize the projected reference line (light beam LB). Rotating the light line generating device 10 automatically activates the protractor 405, which allows a user to measure the angle between the projected light beam LB and the vertical plumb line (or the horizon). This measurement is then displayed through the viewing pane 140 of the housing 100.

The light line generating device 10 of the present invention may further be adapted to mount onto a supporting or work surface, e.g., a generally vertical work surface such as a wall. FIGS. 6-8 illustrate a work surface attachment mechanism in accordance with an embodiment of the present invention. In particular, FIG. 6 is a rear view of the light line generating device 10, showing the rear housing portion 160. FIG. 7 is an isolated, top perspective view of a surface mounting device 700 according to an embodiment of the invention. As illustrated, the rear housing portion 160 may include magnet 600 operable to slidably engage a connection ring 710 (e.g., a metal ring) located on the surface mounting device 700. The surface mounting device 700 may include, but is not limited to, a generally circular disk. The surface mounting device 700 may include a fastener mount 720 configured to receive a fastener such as a screw. The fastener mount 720 may include an aperture 730 adapted to receive a fastener and a conical recess 740 designed to receive the head and shank of the fastener. With this configuration, any type of screw head that fits through the aperture 730 will "self center" on the conical recess 740 when tightened. In operation, once the surface mounting device 700 is placed in a desired position, a fastener is inserted into the aperture 730 and engages the work surface. The screw head is positioned within the conical recess 740, supporting the surface mounting device 700 on the work surface. Alternatively or in addition to, the surface mounting device 700 may include a hole (not illustrated) operable to receive a pointed fastener (e.g., a pushpin, nail, tack, etc.) which would extend through hole to engage the work surface and secure the surface mounting device thereto.

In operation, the surface mounting device 700 may be mounted onto a work surface utilizing a fastener as explained above. The surface mounting device 700 may then be oriented such that the connection ring 710 faces outward, away from the work surface. The magnet 600 located in the rear housing portion 160 may then be aligned with the connection ring 710, coupling the light line generating device 10 to the surface mounting device 700. While coupled together, the light line generating device 10 may be rotated with respect to the surface mounting device 700, as indicated by arrow R (if desired). That is, once connected, the light line generating device 10 may be selectively rotated about the connector 700 to any desired angular position including, but not limited to, 360° of rotation. Thus, the interaction between the magnet 600 and the connection ring 710 stabilizes the light line generating device 10, holding it in place, while still allowing its rotation with respect to the work surface.

Figure 9:
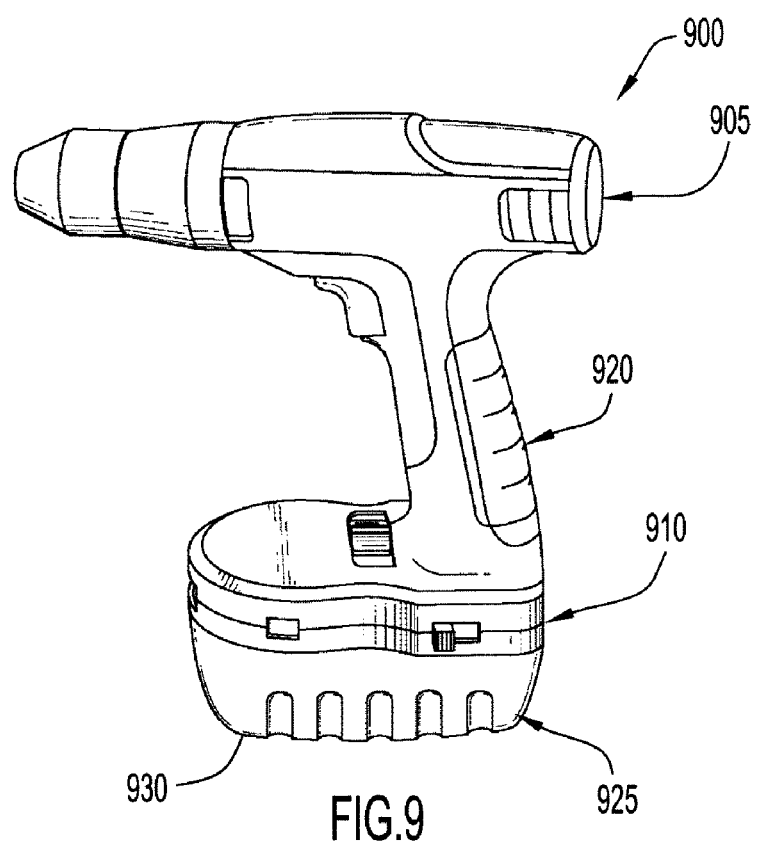
FIG. 9 is a side perspective view of a hand tool incorporating the light line generating device of FIG. 1A.
Figure 10:
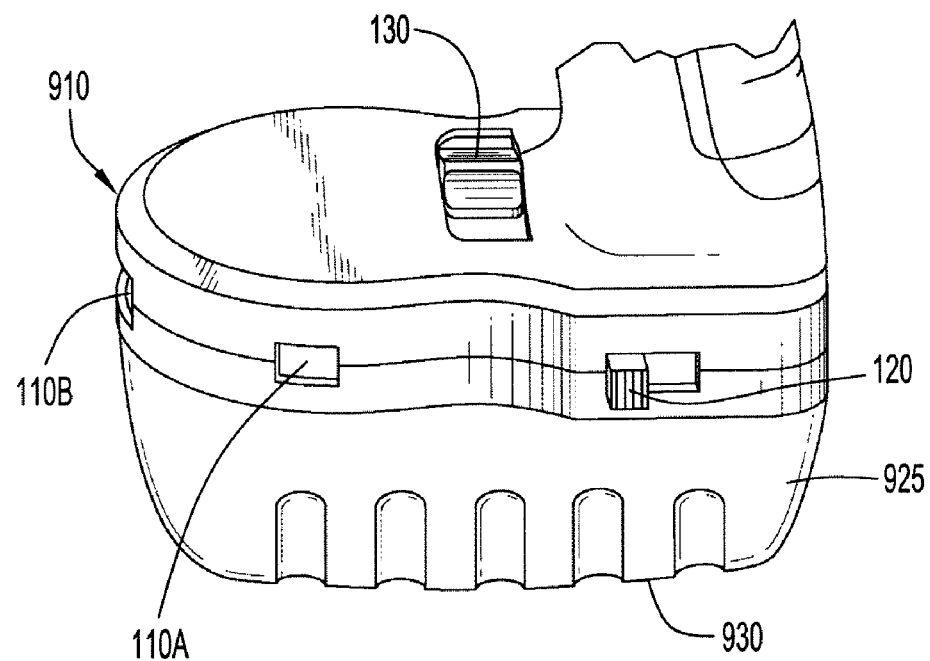
FIG. 10 is a close-up view of the light line generating device of FIG. 9.

In addition to being a stand-alone device, the light line generating device 10 of the present invention may be integrated with hand tools such as a power drill. FIGS. 9-10 illustrate a light line generating device 10 in accordance with another embodiment of the invention. FIG. 9 is perspective view of a hand tool 900 including a light line generating device 910 in accordance with an embodiment of the present invention incorporated therein. As illustrated, the hand tool 900 may include a tool portion 905 (e.g., a drill), a light line generating device 910, and a handle portion 920. FIG. 10 illustrates a close-up view of the hand tool 900 of FIG. 9, showing the light line generating device 910 integrated into the hand tool 900 at the base 925 of the handle portion 920. The light line generating device 910 may include a structure similar to that described above, including windows 110A, 110B, 110C, a pendulum assembly 200 (with a light source 210), and a redirection assembly 400.

The light line generating device 910 may further include a first actuator 120 operable to supply power to the tool portion 905 and/or the light line generating device 910. Power to the tool portion 905 and the light line generating device 910 may be provided via a power source (e.g., a battery) also stored in the base 925 of the handle portion 920. The tool portion 905 and the light line generating device 910 may be powered via the same power source, or may have individual power sources. The light line generating device 910 may also include a second actuator 130 similar to that described above. Specifically, the second actuator 130 may be configured to selectively orient the redirection assembly 400 to direct a light beam LB through a desired window 110A, 110B, 110C.

In operation, the light line generating device 910 is placed against a supporting or work surface such as a wall. Specifically, the bottom surface 930 of the base 925 may be placed against a generally vertical work surface. The light source 210 may be activated to product a light beam LB, generating a light line on the work surface. The pendulum assembly 200 provides the self-leveling feature as described above, while the redirection assembly 400 enables a user to selectively direction the light beam LB out of a desired window 110A, 110B, 110C as described above. The light line generated on the work surface may be used to create reference marks using, e.g., a pencil. A user may then utilize the hand tool 900 to act upon (e.g., drill into) the work surface, using the reference marks as a guide.

While the present invention has been described in detail and with reference to specific embodiments thereof, it will be apparent to one skilled in the art that various changes and modifications can be made therein without departing from the spirit and scope thereof. For example, the housing 100 of the light generating device 10 may possess any suitable dimensions, and may be any shape suitable for its described purpose. The housing 100 may be shaped to prevent its placement on a horizontal surface such as a floor. The light source 210 may be any source capable of producing a light beam and directing it toward the redirection assembly 400. Though shown as fixed to the pendulum 205, the light source 210 may slide along to pendulum to adjust the distance between the light source and the redirection assembly 400. The pendulum lock mechanism may be configured such that the bar 245 is spring biased out of engagement with the pendulum 205, wherein the first actuator 240 forces the bar 245 into engagement with the pendulum 205.

The windows 110A, 110B, 110C may be of any shape and include any desired dimensions. The windows 110A, 110B, 110C, moreover, may be sized to prevent the light beam LB from projecting out of housing 100 when the pendulum assembly 200 contacts another component disposed within housing 100. Additionally, the windows 110A, 110B, 110C may further prevent the light beams LB from exiting the housing 100 when the pendulum assembly 200 approaches the limits of its angular range. In other words, assuming an angular range being between about −6° to about +6° from normal (i.e., a vertical centerline to where the pendulum assembly 200 self-levels), and where pendulum assembly 200 may travel at any angle beyond this range, the size and/or shape of the windows 110A, 110B, 110C may be configured to block the light beams when the pendulum 205 travels beyond about −5° and/or about +5° from normal. This configuration prevents a user from relying on the emitted beam (as substantially horizontal or vertical) when the pendulum has nearly reached or surpassed its range of motion—as the beam may no longer actually represent true plumb or horizon.

The redirection assembly 400 may include any structure configured to selectively redirect the light beam LB generated by the light source 210. By way of specific example, instead of a mirror pair 420, 425, the redirection assembly 400 may include a prism to alter the pathway of the light beam LB. By way of further example, a pentaprism may be positioned on the platform 415. The five-sided reflecting prism may be selectively positioned (e.g., rotated) into the travel path of the light beam LB, redirecting the light beam by 90°. The redirection assembly 400, moreover, may be selectively rotated in clockwise and/or counterclockwise directions.

In addition, the second actuator 130, operable to rotate redirection assembly 400, may include any suitable switch and be disposed at any suitable location. By way of specific example, the second actuator may include knob or lever located on top of, on the rear portion 160 of, or on the front portion 150 of the hosing 100. Similarly, the surface mounting device 700 may possess any suitable dimensions and be any shape suitable for its described purpose.

The hand tool 900 may include any hand tool suitable for acting on a work surface. Though a cordless drill is illustrated, the hand tool 900 may include other corded and cordless tools such as a saw, a screwdriver, a nail gun, a staple gun, etc. The hand tool 900 may further include the measuring tool 405 as described above.

A light line generating device 10 in accordance with the present invention may further include a stud sensor circuit. Information relating to the stud sensor circuitry may be found in U.S. Pat. Nos. 4,099,118 and 4,464,622, the disclosures of which are herein incorporated by reference in their entireties.

Thus, it is intended that the present invention covers the modifications and variations of this invention provided they come within the scope of the appended claims and their equivalents. It is to be understood that terms such as "top", "bottom", "front", "rear", "side", "height", "length", "width", "upper", "lower", "interior", "exterior", and the like as may be used herein, merely describe points of reference and do not limit the present invention to any particular orientation or configuration.

We claim:

1. A self-leveling, light beam generating device for creating a light line on a work surface in a plurality of positions, the device comprising:
    a housing;
    a pendulum assembly including:
        a pendulum pendulously suspended within the housing such that the pendulum moves about a pendulum axis, and
        a light source fixed to the pendulum, wherein the light source is operable to generate a beam of light along a pathway in a first direction; and
    a light beam redirection assembly capable of moving from a first position to a second position with respect to the light source, the light beam redirection assembly operable to selectively redirect the beam of light from the first direction to a second direction,
    wherein the redirection assembly and the pendulum move independently of each other.

2. The light beam generating device of claim 1, wherein:
    the light source directs the light beam in a substantially vertical direction; and
    light beam redirection assembly is capable of redirecting the light beam from the substantially vertical direction to a substantially horizontal direction.

3. The light beam generating device of claim 1, wherein the pendulum is pendulously suspended within the housing via a first attachment point and the redirection assembly is rotatably connected to the housing via a second attachment point.

4. The light beam generating device of claim 1, wherein the light beam redirection assembly comprises a first mirror angularly spaced from a second mirror.

5. The light beam generating device of claim 4, wherein:
    in the first redirection assembly position, first mirror is oriented in the pathway of the light beam;
    in the second redirection assembly position, the second mirror is oriented in the pathway of the light beam.

6. The light beam generating device of claim 1, wherein the housing comprises at least one window configured to permit the transmission of the light beam through the housing such that a light line is generated on a work surface.

7. The light beam generating device of claim 6, wherein movement of the redirection assembly from the first position to the second position alters the position of the light line generated on the work surface.

8. The light beam generating device of claim 1, further comprising a measuring tool responsive to rotation of the housing on the work surface.

9. The light beam generating device of claim 8, wherein the measuring tool comprises a protractor.

10. The light beam generating device of claim 1, wherein:
the light source comprises a laser assembly including a laser diode, a collimating lens, and a line lens; and
the redirection assembly is disposed in spaced relation from the laser assembly.

11. The light line generating device of claim 1, wherein the pendulum assembly is pendulously suspended to pivot along a plane generally transverse to the light beam pathway.

12. The light line generating device of claim 11, wherein the pendulum assembly further comprises a damping mechanism.

13. The light line generating device of claim 11 further comprising a lock mechanism operable secure the pendulum assembly and prevent its pivotal motion.

14. The light line generating device of claim 13, wherein a first actuator selectively engages and disengages the lock mechanism, as well as selectively activates and deactivates the light source.

15. The light line generating device of claim 1 further comprising an actuator in communication with the redirection assembly, the actuator being operable to selectively reposition the redirection assembly from the first position to the second position.

16. The light line generating device of claim 1, wherein the beam of light is self leveling in both the first direction and second direction.

17. The light line generating device of claim 1, wherein:
the device comprises a single light source; and
the device is operable to generate both vertical and horizontal light lines.

18. The light line generating device of claim 1, wherein:
the light source comprises a laser assembly including a line lens; and
the redirection assembly is oriented in spaced relation from the laser assembly.

19. A light line generating device comprising:
a housing including a first window and a second window;
a self leveling pendulum assembly disposed within the housing including:
a pendulum pendulously suspended such that it moves about a pendulum axis, and
a light source operable to create a light line on a work surface, wherein the light source emits a light beam traveling in a first direction; and
a redirection assembly disposed within the housing configured to move about a redirection assembly axis,
wherein the redirection assembly is movable from a first position, in which the assembly permits the light beam to continue traveling in the first direction, to a second position, in which the redirection assembly redirects the light beam from the first direction to a second direction, and wherein the redirection assembly moves independently of the pendulum.

20. The light line generating device of claim 19, wherein:
in the first direction, the light beam is directed out of the first window; and
in the second direction, the light beam is directed out of the second window.

21. The light line generating device of claim 20, wherein:
the housing further includes a third window;
the redirection assembly is movable to a third position, in which the assembly redirects the light beam from the first direction to a third direction; and
in the third direction, the light beam is directed through the third window.

22. The light line generating device of claim 19, wherein the redirection assembly is further movable to a third position, in which the redirection assembly redirects the light beam from the first direction to a third direction.

23. The light line generating device of claim 19, wherein redirection assembly comprises a mirror assembly including a first mirror and a second mirror.

24. The light line generating assembly of claim 19, wherein:
the light source comprises a laser assembly including a laser diode, a collimating lens, and a line lens; and
the redirection assembly is oriented in spaced relation from the laser assembly.

25. The light line generating assembly of claim 19, wherein the redirection assembly is rotatable between the first position and the second position, and vice versa.

26. The light line generating assembly of claim 19, wherein the pendulum assembly is capable of pivoting within a plane that is generally transverse to the light beam first direction.

27. The light line generating device of claim 26 further comprising a lock mechanism operable secure the pendulum assembly, selectively preventing the pivotal motion of the pendulum assembly.

28. The light line generating assembly of claim 19, wherein the pendulum assembly further comprises a damping mechanism.

29. The light beam generating device of claim 19 further comprising a measuring tool responsive to rotation of the housing with respect to a supporting surface.

30. The light beam generating device of claim 29, wherein the measuring tool comprises a protractor.

31. A method of generating a light line on a work surface comprising the steps:
(a) providing a light beam generating device including:
a pendulum assembly including a pendulum pendulously suspended within a housing,
a light source configured to generate a beam of light, the light source being fixed to the pendulum, and
a light beam redirection assembly operable to move from a first orientation to a second orientation,
wherein the pendulum and the redirection assemblies move independently of each other;
(b) directing the light beam toward the redirection assembly;
(c) positioning the redirection assembly in the first orientation to cause the light beam to generate a light line on the work surface in a first direction; and
(d) positioning the redirection assembly in the second orientation to cause the light beam to generate a light line on the work surface in a second direction.

32. The method of claim 31, wherein:
the work surface comprises a generally vertical work surface;
the light beam generating device further comprises a measuring tool responsive to rotation of the housing on the work surface; and
the method further comprises (e) placing the light beam generating device on the work surface in a normal position and (f) rotating the light beam generating device from the normal position to a position offset from normal.

33. A self-leveling, light beam generating device comprising:
   a housing;
   a pendulum assembly including:
      a pendulum pendulously suspended within the housing via a first attachment point, and
      a single light source fixed to the pendulum, wherein the light source is operable to generate a beam of light along a pathway; and
   a light beam redirection assembly connected to the housing via a second attachment point,
   wherein the redirection assembly is capable of moving from a first position to a second position to selectively redirect the beam of light such that the light beam generating device is operable to selectively generate at least a vertical line and a horizontal line.

34. The light beam generating device of claim 33, wherein:
   the light beam generates a light line on a work surface; and
   movement of the redirection assembly from the first position to the second position alters the position of the light line on the work surface.

35. The light beam generating device of claim 33 further comprising a measuring tool responsive to rotation of the housing with respect to a supporting surface.

36. The light beam generating device of claim 33, wherein the measuring tool comprises a protractor including a weighted area that maintains a substantially constant position with respect to the plumb line of the supporting surface as the housing is rotated.

37. A method of measuring the angle between light lines on a generally vertical work surface comprising the steps:
   (a) providing a light line generating device comprising:
      a pendulum assembly including a light source configured to generate a beam of light,
      a housing including at least one window operable to permit the transmission of the light beam from the housing to generate a light line on the work surface, and
      a measuring tool coupled to housing such that the tool rotates about an axis, wherein the measuring tool is responsive to rotation of the housing with respect to the work surface;
   (b) mounting the light line generating device to the work surface;
   (c) activating the light source to generate a light line on the work surface; and
   (d) rotating the housing to move the light line from a first position to a second position,
   wherein the measuring tool measures a rotation angle between the first light line position to the second light line position.

38. The method of claim 37, wherein:
   the measuring tool comprises a protractor adapted to rotate about an axis; and
   rotating the housing causes a corresponding opposite rotation of the protractor about the axis.

39. The method of claim 37, wherein:
   the light line generating device further includes a mounting device rotatably coupled to the housing;
   step (b) comprises (b.1) connecting the surface mounting device to the work surface; and
   step (d) comprises (d.1) rotating the housing on the surface mounting device.

40. A hand tool comprising:
   a tool portion;
   a handle portion; and
   a light line generating device comprising:
      a housing;
      a self-leveling pendulum assembly including:
         a pendulum, and
         a light beam device fixed to the pendulum comprising:
            a light source, and
            a line lens,
         wherein the light beam device directs a beam of light along a pathway in a first direction; and
      a light beam redirection assembly disposed in spaced relation from the line lens, wherein the redirection assembly is configured to alter the travel path of the light beam, and wherein moving the redirection assembly from a first position to a second position selectively redirects the beam of light such that it travels in a second direction.

41. The hand tool of claim 40, wherein the pendulum is pendulously suspended within the housing via a first attachment point and the redirection assembly is rotatably connected to the housing via a second attachment point.

42. The hand tool of claim 40, wherein the redirection assembly selectively reflects the light beam to alter is travel path.

43. A light line generating device comprising:
   a housing including a first window, a second window, and a third window;
   a self-leveling pendulum assembly disposed within the housing including:
      a pendulum, and
      a light source operable to create a light line on a work surface, wherein the light source emits a light beam traveling in a first direction; and
   a redirection assembly disposed within the housing,
   wherein the redirection assembly is movable from a first position, in which the light beam is directed out of the first window, to a second position, in which the light beam is directed out of the second window, and further to a third position, in which the light beam is directed through the third window.

44. A light line generating device comprising:
   a housing;
   a self-leveling pendulum assembly disposed within the housing including:
      a pendulum, and
      a light source operable to create a light line on a work surface, wherein the light source emits a light beam traveling in a first direction; and
   a redirection assembly disposed within the housing,
   wherein the redirection assembly is movable from a first position, in which the assembly permits the light beam to continue traveling in the first direction, to a second position, in which the assembly redirects the light beam from the first direction to a second direction, and further to a third position, in which the redirection assembly redirects the light beam from the first direction to a third direction.

45. The light line generating device of claim 44, wherein the housing comprises a first window and a second window.

46. A light line generating device comprising:
   a housing;
   a self leveling pendulum assembly disposed within the housing including:
      a pendulum, and a light source operable to create a light line on a work surface, wherein the light source emits a light beam traveling in a first direction; and a redirection assembly disposed within the housing, wherein redirection assembly comprises a mirror assembly including a first mirror and a second mirror, wherein the redirection assembly is movable from a first position, in which the assembly permits the light beam to continue traveling in the first direction, to a second position, in which the assembly redirects the light beam from the first direction to a second direction.

47. The light line generating device of claim 46, wherein the housing comprises a first window and a second window.

48. A self-leveling, light beam generating device comprising:

a housing;

a pendulum assembly including:

a pendulum pendulously suspended within the housing via a first attachment point, and a light source fixed to the pendulum, wherein the light source is operable to generate a beam of light along a pathway;

a light beam redirection assembly connected to the housing via a second attachment point; and a measuring tool comprising a protractor including a weighted area that maintains a substantially constant position with respect to the plumb line of the supporting surface as the housing is rotated, wherein the redirection assembly is capable of moving from a first position to a second position to selectively redirect the beam of light out of the housing.

49. A method of measuring the angle between light lines on a generally vertical work surface comprising the steps:

(a) providing a light line generating device comprising:

a pendulum assembly including a light source configured to generate a beam of light, a housing including at least one window operable to permit the transmission of the light beam from the housing to generate a light line on the work surface, and a measuring tool responsive to rotation of the housing with respect to the work surface, wherein:

the measuring tool measures a rotation angle between the first light line position to the second light line position, the measuring tool comprises a protractor adapted to rotate about an axis, and rotating the housing causes a corresponding opposite rotation of the protractor about the axis;

(b) mounting the light line generating device to the work surface;

(c) activating the light source to generate a light line on the work surface; and (d) rotating the housing to move the light line from a first position to a second position.

* * * * *